United States Patent [19]

Scruggs

[11] Patent Number: 5,511,589
[45] Date of Patent: Apr. 30, 1996

[54] POWER OPERATED SAFETY CABLE TOOL

[75] Inventor: Michael G. Scruggs, Orlando, Fla.

[73] Assignee: Daniels Manufacturing Corporation, Orlando, Fla.

[21] Appl. No.: 261,104

[22] Filed: Jun. 16, 1994

Related U.S. Application Data

[63] Continuation-in-part of Ser. No. 945,095, Sep. 5, 1992, Pat. No. 5,361,475, which is a continuation-in-part of Ser. No. 831,186, Feb. 5, 1992, Pat. No. 5,230,129.

[51] Int. Cl.⁶ .................................................... B21F 9/02
[52] U.S. Cl. ........................................ 140/93.2; 140/123.6
[58] Field of Search ................................ 140/93 A, 93.2, 140/119, 123.6

[56] References Cited

U.S. PATENT DOCUMENTS

| | | | |
|---|---|---|---|
| 3,169,560 | 2/1965 | Caveney et al. | 140/123.6 |
| 3,391,440 | 7/1968 | Harms | 140/93.2 |
| 3,526,187 | 9/1970 | Gilliard | 100/2 |
| 3,661,187 | 5/1972 | Caveney et al. | 140/123.6 |
| 3,670,782 | 6/1972 | Kabel | 140/93.2 |
| 4,718,460 | 1/1988 | Sato | 140/93.2 |
| 4,934,416 | 6/1990 | Tonkiss | 140/93.2 |
| 5,123,456 | 6/1992 | Jansen | 140/93.4 |
| 5,138,909 | 8/1992 | Plyter | 81/9.41 |
| 5,230,129 | 7/1993 | Scruggs | 29/267 |
| 5,355,913 | 10/1994 | Green et al. | 140/123.6 |

*Primary Examiner*—Lowell A. Larson
*Attorney, Agent, or Firm*—James H. Beusse

[57] ABSTRACT

A tool for tensioning safety cable to a predetermined tension limit includes a reciprocally rotatable wheel mounted for rotation about a point on the tool for incrementally advancing the cable. A gear assembly is coupled to the rotatable wheel and has at least one driven gear connected to affect rotation of the wheel. A power actuator is coupled to the gear assembly and adapted for affecting reciprocal rotation of the at least one driven gear to thereby affect rotation of the wheel. The cable is attached to the wheel after being drawn through bolts to be restrained by the cable. The tool includes apparatus for terminating the cable to restrain it with the desired tension.

11 Claims, 4 Drawing Sheets

POWER OPERATED SAFETY CABLE TOOL

This is a continuation-in-part of application Ser. No. 07/945,095, filed Sept. 5, 1992, now Pat. No. 5,361,475, which is a continuation-in-part of application Ser. No. 07/831,186, filed Feb. 5, 1992, now Pat. No. 5,230,129.

The present invention relates to apparatus for attaching safety cables to releasable fasteners and, more particularly, to power actuated apparatus for tensioning, locking and terminating safety cables.

BACKGROUND OF THE INVENTION

Various types of machinery are subject to vibration which can loosen nuts and bolts. Safety wire has long been used as protection to resist such loosening. In such use, safety wire secures two or more parts together so that loosening of one part is counteracted by tightening of the wire. Typically, a single wire is passed through an aperture in a nut or bolt, the free ends twisted together up to another part, one of the ends inserted through an aperture in the another part and the ends again twisted. The standards for utilization of safety wire are critical and are set forth in Aerospace Standard AS567, entitled "General Practices for the Use of Lockwire, Key Washers and Cotter Pins," available from the Society of Automotive Engineers, Inc., 400 Commonwealth Dr., Warrendale, Pa.

Safety wire or lockwire, as it is sometimes known, has several known problems. More recently, there has been developed an improved locking system using safety cable. Safety cable is a stranded cable having a termination on one end allowing the cable to be pulled to a predetermined tension through the aforementioned apertures in nuts and bolts. After tensioning, the free end of the cable must be terminated to hold the tension and cleanly severed to minimize any possibility of snags on loose wires. Accordingly, it is desirable to provide a tool which simultaneously crimps a ferrule onto the cable and severs the free end of the cable while establishing a predetermined tension in the cable.

SUMMARY OF THE INVENTION

A tool for tensioning safety cable to a predetermined tension limit and for automatically terminating the cable when the cable has been tensioned to the predetermined limit includes means for grasping and pulling the cable to the predetermined tension limit and means for automatically crimping a ferrule onto the cable when the predetermined tension limit is reached. The crimping means is also operative to sever a free end of the cable concurrently with crimping of the ferrule. More particularly, the tool comprises power actuated drive means, a rotatable wheel mounted to the tool for incrementally winding the cable about at least a portion of the wheel during a drive stroke of the drive means and a toggle assembly operatively connected to the drive means for terminating the cable when cable tension reaches a preselected value. Tension setting means is operatively coupled to the drive means for inhibiting rotation of the wheel when cable tension reaches the preselected value. The tool also includes clamping means operative in response to inhibited advancement of the cable for terminating the cable. The clamping means may be a ferrule held in the tool and a plunger assembly operative to compress the ferrule when the preselected tension is reached. In one form, the plunger assembly pushes the ferrule in a shearing action adjacent an aperture through which the cable extends so as to simultaneously shear the cable.

In an exemplary form, the drive means comprises a pneumatic cylinder mounted in a handle of the tool and having first and second reciprocally operated rods extending therefrom. The first rod is coupled to the rotatable wheel by a gear drive which converts linear motion to circular motion whereby linear motion of the first rod affects rotation of the wheel. The first rod is frictionally mounted on the second rod such that a preselected tension on the cable will cause the first rod to slip with respect to continued movement of the second rod. The second rod, proximate its extreme travel position, actuates the toggle assembly to effect termination of the cable.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figures 1, 2:
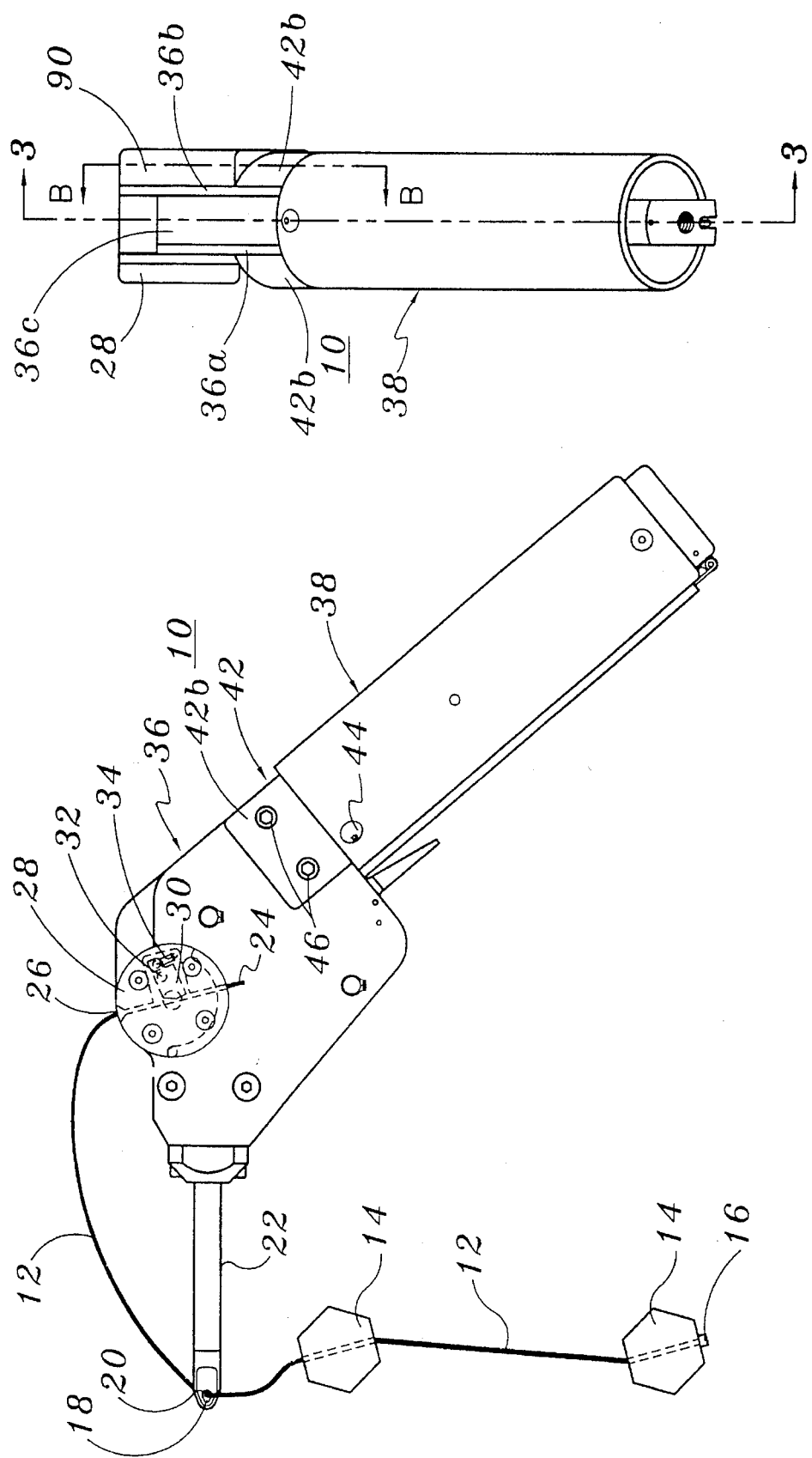
FIG. 1 is a side view of a tool according to the present invention.
FIG. 2 is a top view of the tool of FIG. 1.

Referring to the FIGS. in general and in particular to FIGS. 1 and 2, there is shown a side view and a top view, respectively, of a power actuated safety cable tool 10 in accordance with the present invention. The tool 10 is adapted to tension a safety cable 12 passing through apertures in each of the bolt heads 14. A ferrule 16 is crimped onto cable 12 to prevent it from being pulled through the bolt head apertures. A second ferrule 18 is seated in an aperture 20 in a nosepiece 22 of tool 10 in a position to be crimped onto cable 12 when a preselected tension has been pulled on cable 12 by tool 10. A free end 24 of cable 12 is fed into and through a passageway 26 in a rotatable means such as a pulley or wheel 28. A spring loaded pawl 30 in wheel 28 pivots about pin 32 and is pivotably urged towards passageway 26 by spring 34. An end of pawl 30 is adapted to engage cable 12 within passageway 26 and compress cable 12 against a side of the passageway to thereby restrain the cable within wheel 28. The wheel 28 is reciprocally rotatable with clockwise rotation being effective to tighten or tension cable 12.

The nosepiece 22 and wheel 28 are mounted on a tool housing 36 which includes a pair of opposite side plates 36a, 36b, attached to an inner frame member 36c. The housing 36 is attached to a handle assembly 38 which has a generally cylindrical configuration and forms a casing for a power actuator. The actuator is preferably a pneumatic cylinder but could be a hydraulic cylinder or a linear electric motor such as a solenoid.

Figure 3:
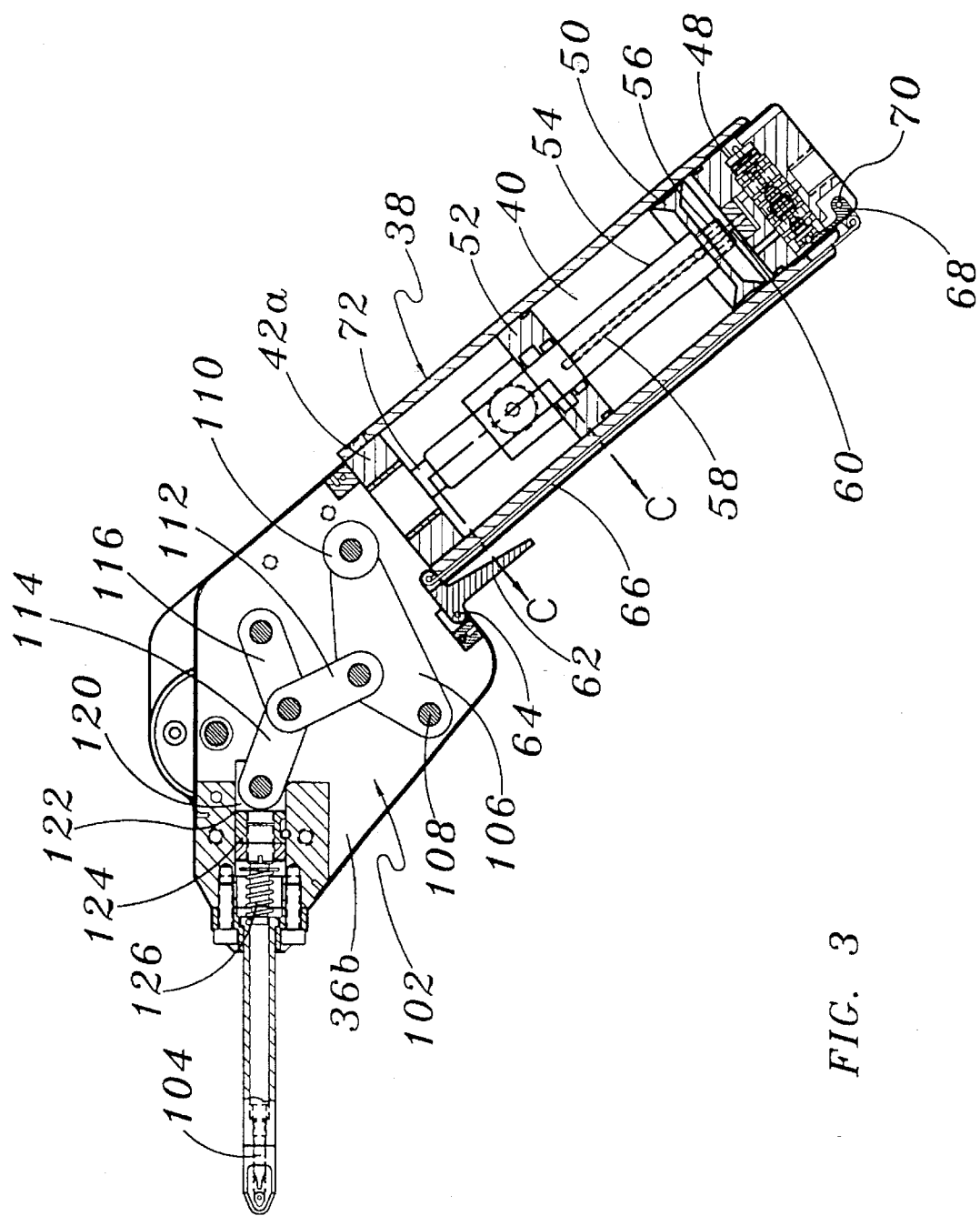
FIG. 3 is a cross-sectional view of the tool of FIG. 1 taken along the line 3—3 of FIG. 2.

Considering FIG. 3 in conjunction with FIGS. 1 and 2, the handle assembly 38 is connected to tool housing 36 by a support member 42 having a cylindrical portion 42a which fits snugly in an open end of assembly 38 and is held in assembled position by a plurality of circumferentially spaced screws 44. The remaining portion 42b of member 42 has a larger outer diameter than portion 42a, such larger diameter being preferably the same as the outer diameter of handle assembly 38. The transition from portion 42a to portion 42b forms a shoulder that can seat on the end of assembly 38 and facilitate positioning of member 42. The portion 42b is also machined or formed into a clevis configuration sized to receive the housing 36. Screws 46 are used to attach housing 36 to portion 42b and thereby assemble the handle assembly 38 to housing 36.

Turning to FIG. 3, which is a cross-sectional view taken along lines 3—3 of FIG. 2, the handle assembly 38 incorporates a pneumatic cylinder 40 having an air control valve 48, a moveable diaphragm 50 and a bulkhead 52. A push rod 54 is attached at one end to diaphragm 50 such as by a nut 56 screwed onto a threaded end of the rod. Rod 54 has a central passageway 58 extending longitudinally partially through the rod and adapted for receiving a hollow air stem 60. A seal 62 fits in a recess in the end of rod 54 circumscribing stem 60 and preventing air leakage around the stem. The valve 48 is a commercially available air valve and is described in more detail, along with the operation of a pneumatic cylinder substantially identical to cylinder 40, in U.S. Pat. No. 5,138,909, the disclosure of which is hereby incorporated by reference. The valve 48 is actuated by a trigger 62 which pivots about a pin 64 to move a rod 66 in a direction parallel to handle assembly 38. Rod 66 connects to a secondary trigger 68 which pivots about a pin 70 to translate motion of rod 66 through 90° for actuating valve 48.

Figure 4A:
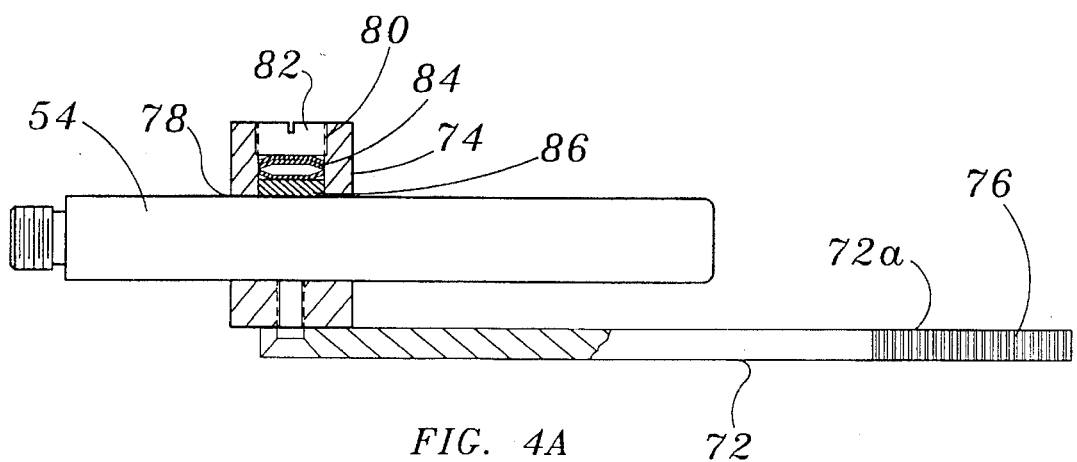
FIGS. 4A and 4B are top and side views of the actuating rods used in the tool of FIG. 1.
Figure 4B:
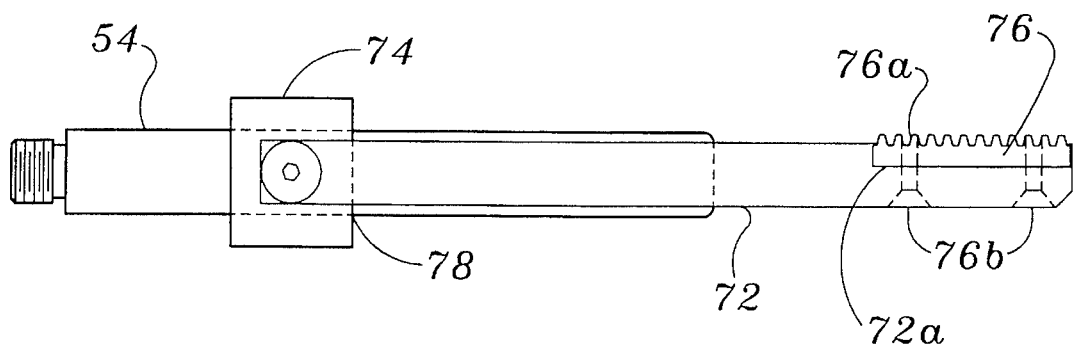

Inside handle assembly 38, push rod 54 extends through bulkhead 52, through a central aperture in support member 42 and terminates in tool housing 36. Above bulkhead 52, another rod 72 is frictionally mounted to rod 54. Referring briefly to FIGS. 4A and 4B, there is illustrated a partial cross-sectional view looking at the top of the assembled rods 54,72 and a side view of the assembly, respectively. The rod 54 is preferably a hardened stainless steel cylindrical rod while the rod 72 is merely a rectangular bar attached to a support member 74. Rod 72 includes a rectangular cut-out section at 72a in which is inserted a hardened steel insert 76 having an arrangement of linear teeth 76a extending from an exposed surface. The insert 76 is attached to rod 72 by screws indicated at 76b. The rod 72 is coupled to rod 54 by support 74 which comprises a metal block having a central passageway 78 through which rod 54 is inserted and a perpendicularly oriented opening 80 connecting to passageway 78. At least the outermost portion of opening 80 is threaded for receiving a set screw 82. A plurality of Belville washers 84 are positioned in opening 80 overlaying an insert 86. The amount of frictional engagement between rod 72 and rod 54 is set by adjusting the position of screw 82 to compress washers 84 against insert 86 bearing on rod 54. When rod 54 is driven by movement of diaphragm 50 of cylinder 40, rod 72 will move concurrently until the resistance against rod 72 exceeds the force required to overcome the frictional engagement between the rods.

Figure 5:
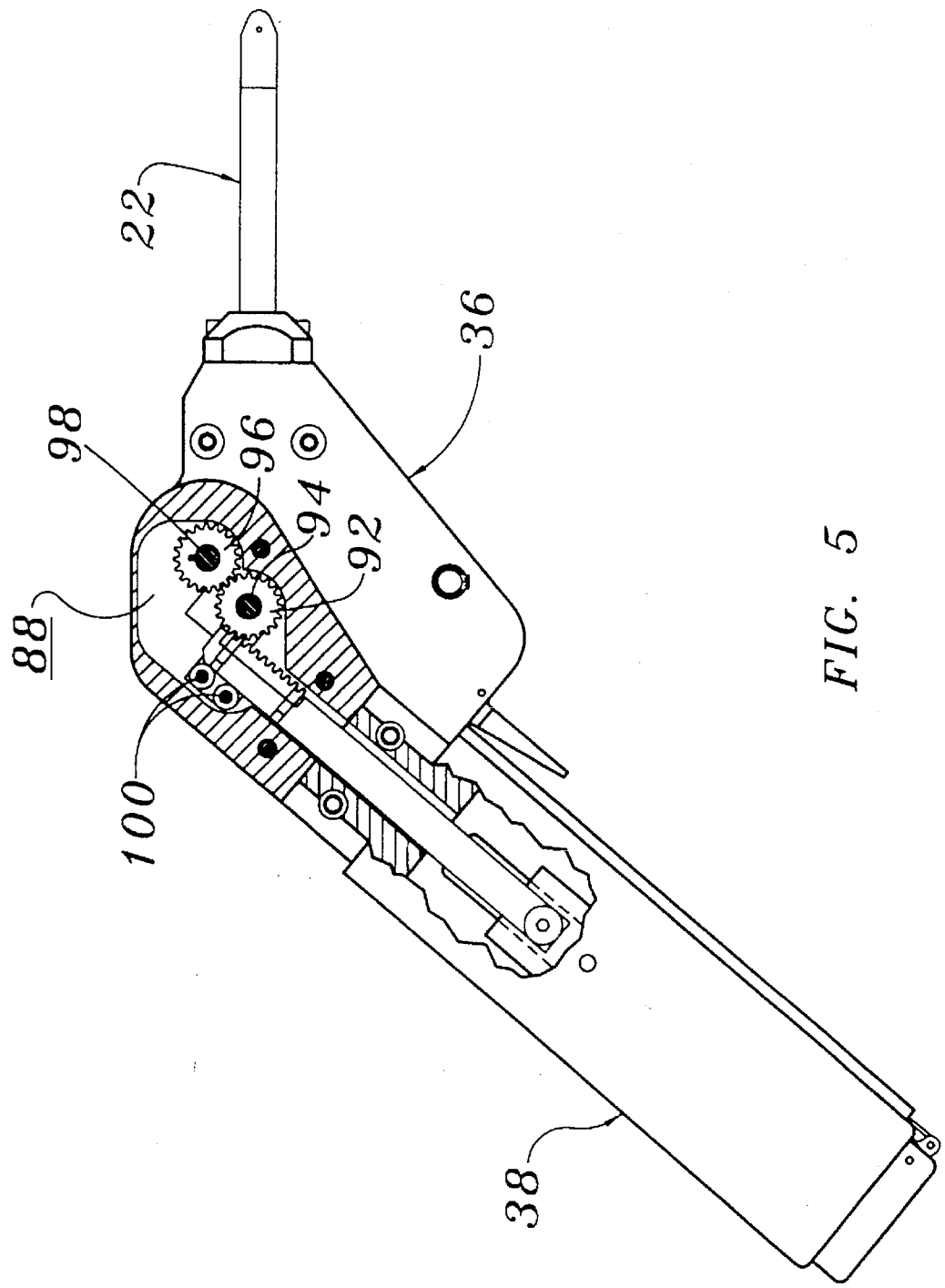
FIG. 5 is a partial cross-sectional view of the tool of FIG. 1 taken along the line 5—5 in FIG. 2.

Referring again to FIG. 3 and to FIG. 5, the latter being a partial cross-sectional view of the side of tool 10 opposite the view of FIG. 3, the rod 54 is driven linearly in a reciprocating manner by operation of the cylinder 40 carrying rod 72. The teeth 76a of insert 76 extend into a gear assembly 88 enclosed in a housing 90 (see FIG. 2) and engage a first gear 92 rotatable about an idler shaft 94. Gear 92 mates with a driven gear 96 rotating on a drive shaft 98. Two gears 92, 96 are used since the drive stroke of rod 72 is outwardly of cylinder 40 towards the gear assembly 88 causing the gear 92 to be rotated clockwise. However, the direction of tensioning of cable 12 requires a counterclockwise rotation of wheel 28. Gear 96 is coupled directly to wheel 28 via drive shaft 98 and is rotated counterclockwise in response to clockwise rotation of gear 92. If the tool were arranged for tensioning using a clockwise rotation of wheel 28, one gear could be eliminated. The rod 72 is held in contact with gear 92 by a pair of rollers 100 pressing rod 72 toward gear 92.

At the same time as rod 72 is driving gear assembly 88, rod 54 is moving towards linkage or toggle assembly 102 which assembly operates to terminate cable 12. As described in U.S. patent application Ser. No. 07/945,095, cable 12 passes through aperture 20 in nosepiece 22 and a ferrule 18 seated in the aperture 20. The nosepiece 22 is pressed against the bolt head 14 so that the ferrule 18 is in contact with the bolt head. As the cable is tightened to the desired tension, a plunger 104 is forced into contact with ferrule 18 and crimps the ferrule onto cable 12. The plunger 104 is so designed that an edge of the plunger drives the cable past the exit side of aperture 20 causing the cable 12 to be sheared adjacent the ferrule 18.

The plunger 104 is depressed by actuation of toggle assembly 102 which comprises a toggle link 106 pivotably mounted at pin 108 to frame side member 36b at one end thereof. An opposite end of link 106 has a roller 110 attached so as to engage an end of rod 54. An intermediate connecting link 112 is pinned to about a midpoint of link 106 and extends to a three-point connection at the intersection of two other links 114 and 116. Link 116 is pivotally mounted by pin 118 to member 36b.

Link 114 is preferably a clevis type link to minimize side directed forces and maintain alignment with an end opposite link 116 connected to a block 120 slidably positioned in a passageway 122 in nosepiece 22. Block 120 reacts against a sleeve member 124 in passageway 122, which sleeve member contacts an end of plunger 104. A spring 126 retracts plunger 104. The plunger 104 is driven forward by contact between rod 54 and roller 110 which causes link 106 to pivot and force links 114 and 116 into alignment.

Considering the operation of the tool 10, depressing trigger 62 actuates valve 48 causing air to enter cylinder 40 between diaphragm 50 and the valve assembly 48, which valve assembly seals the lower end of cylinder 40. Diaphragm 50 is driven outward pushing rod 54 towards tool housing 36. Rod 54 carries rod 72 in the same direction by virtue of the frictional engagement through support member 74. The rod 72 engages at its outer end the gear 92 causing gear 92 to rotate and effect rotation of gear 96 thus driving wheel 28. The cable 12 being previously pulled through wheel 28 with nosepiece 22 against bolt head 14 so that essentially no slack is left in the cable, is tensioned by rotation of wheel 28. When a preselected tension is placed on the cable, the tension creates a torque transfer through gears 96 and 92 to rod 72 which overcomes the frictional engagement between rod 54 and rod 72 allowing rod 72 to stop its forward motion while rod 54 is continued to be driven forward. Rod 54 then contacts toggle assembly 102 pushing on link 106 and advancing plunger 104 into ferrule 18 and severing cable 12.

When trigger 62 is released, the valve 48 reverses position allowing air to vent from below diaphragm 50 and flowing air into the space above diaphragm 50 thereby retracting the diaphragm and rod 54. As the rod 54 is retracted, it concurrently retracts rod 72 due to their frictional engagement and rotates gear 92 to reset wheel 28 to its starting position. The position of member 74 on rod 54 is reset by contact of member 74 against bulkhead 52 as diaphragm 50 is reset to its initial position.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A tool for tensioning safety cable to a predetermined tension limit comprising:

rotatable means mounted for rotation about a point on the tool for incrementally advancing the cable;

a gear assembly coupled to said rotatable means and having at least one driven gear connected to affect rotation of said rotatable means;

a power actuator coupled to said gear assembly and adapted for affecting rotation of said at least one driven gear;

tension control means operatively associated with said power actuator for inhibiting rotation of said rotatable means when tension on the cable reaches a preselected value;

means coupled to said power actuator for automatically terminating the cable comprising:

a toggle assembly;

a cable terminating member coupled to be driven by said toggle assembly; and means for actuation of said toggle assembly for terminating the cable at the preselected tension limit; and said power actuator comprising a linear actuator coupled in driving relationship with said gear assembly, said linear actuator including a first drive rod connected to be reciprocally driven by said power actuator and a second drive rod frictionally engaged with said first drive rod, said second drive rod being coupled to said gear assembly and said first drive rod being coupled to actuate said toggle assembly, said second drive rod being coupled to frictionally slide on said first drive rod when tension on the cable reaches the preselected tension limit.

2. The tool of claim 1 and including means for adjusting the frictional engagement between said first and second drive rods for adjusting cable tension to a selected value.

3. The tool of claim 2 wherein said adjusting means comprises a housing attached to said second drive rod and having a passageway therethrough for passing said first drive rod, a spring member positioned in said housing in bearing relationship with said first drive rod, and compression means attached to said housing for compressing said spring member against said first drive rod.

4. The tool of claim 3 wherein said spring member comprises a plurality of Belville washers and said compression means comprises a set screw threadedly engaged in said housing.

5. The tool of claim 2 and including a plurality of gear teeth formed on said second drive rod and a gear in said gear assembly positioned for mating engagement with said gear teeth on said second drive rod, reciprocal linear motion of said second drive rod being converted to reciprocating rotation of said gear, said gear being coupled to said rotatable means for affecting concurrent reciprocating rotation thereof.

6. The tool of claim 1 wherein said power actuator comprises:

a pneumatic cylinder having a diaphragm slidably moveable from a first retracted position to a second extended position;

a push rod coupled to said diaphragm for movement therewith; and a gear drive rod slidably mounted on said push rod and coupled to said gear assembly whereby a preselected tension on the cable will cause said gear drive rod to slide on said push rod thereby inhibiting further tensioning of the cable above the predetermined tension limit.

7. The tool of claim 6 and including a toggle assembly operatively mounted in said tool in a position for being toggled in at least one direction by movement of said push rod, the tool further including an elongated nosepiece extending from an end of the tool, a distal end of said nosepiece having an aperture passing therethrough generally transverse to the elongate direction of said nosepiece for passage of the cable, an entrance side of said aperture being sufficiently large to receive a ferrule and an exit side of said aperture being sized to pass the cable while blocking said ferrule, said ferrule having an opening therethrough for passage of the cable and a plunger mounted within said nosepiece for motion transverse to said aperture, said plunger being operatively coupled to said toggle assembly for compressing said ferrule onto the cable said push rod transitions to a fully extended position in response to transition of said diaphragm to said extended position.

8. The tool of claim 7 wherein said plunger displaces an edge of said ferrule against said exit side of said aperture for shearing the cable against said exit side of said aperture.

9. A tool for tensioning a cable to a preselected tension value comprising:

a handle assembly having a generally cylindrical configuration;

a linear actuator mounted in said handle assembly and having a first and a second power actuated, reciprocating rod extending therefrom;

a cable tensioning assembly mounted to said handle assembly, said cable tensioning assembly including cable tensioning means coupled to said first rod and cable terminating means coupled to said second rod; and means frictionally coupling said first rod to said second rod whereby tensioning motion of said first rod is terminated upon tension in the cable reaching said preselected value.

10. The tool of claim 9 wherein said linear actuator comprises a pneumatic cylinder having a moveable diaphragm coupled to said second rod.

11. The tool of claim 10 wherein said cable tensioning assembly includes a reciprocatable pulley adapted for receiving and holding an end of the cable and a gear drive assembly coupling said first rod to said pulley for tensioning the cable in response to movement of said first rod.

* * * * *